Sept. 27, 1932.  F. H. RAUH  1,879,488
GRASS SHEARS
Filed Dec. 6, 1930
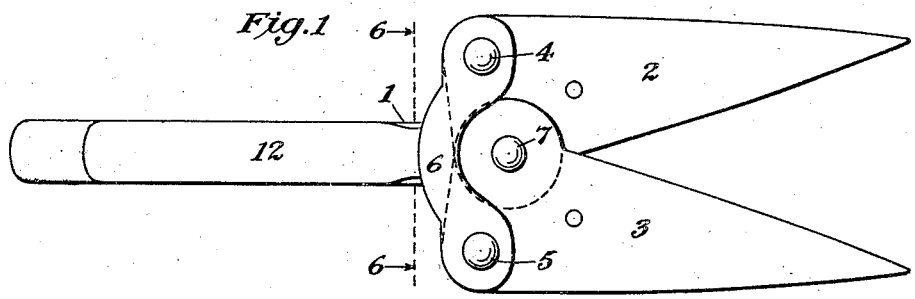
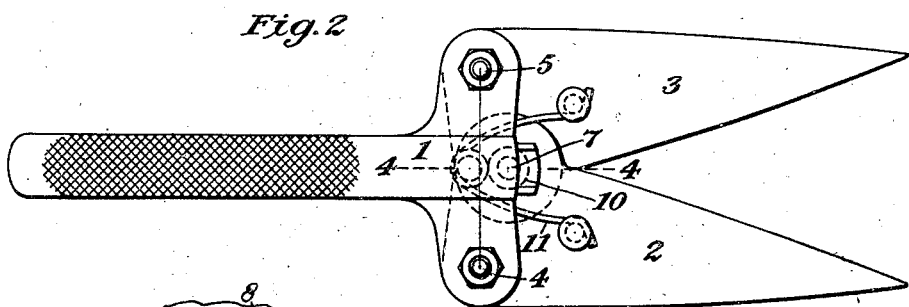
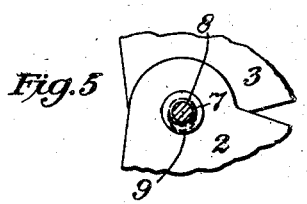
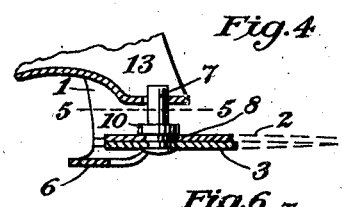
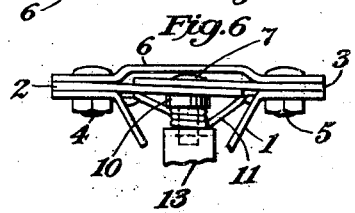
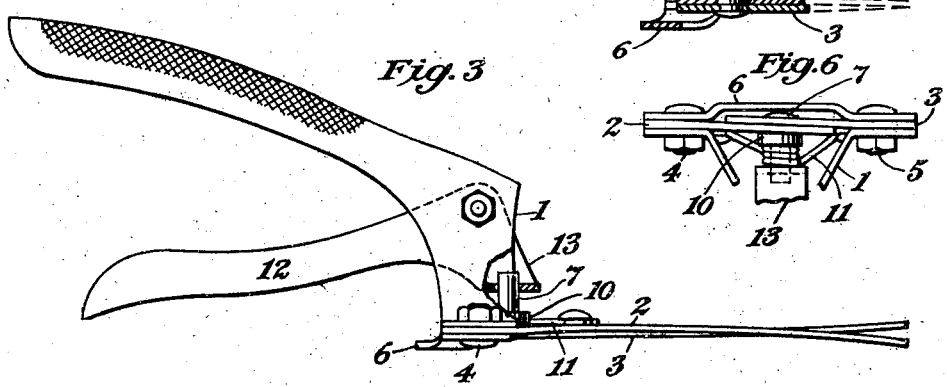
Inventor,
Frederic H. Rauh.
By his Attorney Patented Sept. 27, 1932

1,879,488

UNITED STATES PATENT OFFICE

FREDERIC H. RAUH, OF SOUTH ORANGE, NEW JERSEY, ASSIGNOR TO J. WISS & SONS CO., OF NEWARK, NEW JERSEY, A CORPORATION OF NEW JERSEY

GRASS SHEARS

Application filed December 6, 1930. Serial No. 500,461.

My invention relates to a class of grass shears wherein a pair of blades are independently pivoted to a supporting frame, and the blades are opened and closed in cooperation with each other by the reciprocation of a pin or pivot element operatively engaging both blades.

Objects of my invention are to avoid the tipping or tilting of the connecting pin or pivot; to prevent uneven wear on the pivot pin; to avoid the looseness and back-lash arising from such unequeal wear; to avoid non-positive yielding or wabbling contact between the cutting edges of the blades; to insure a true, shear cut between the blades by causing their edges to lie in close, spring contact during the cutting movement; and to secure the other novel advantages, which are hereinafter pointed out and claimed.

In the drawing, in which similar parts are designated by corresponding numerals in all the figures, Fig. 1 is a bottom view of a grass shear embodying my improvement, the blades being open; Fig. 2 is a plan view of the same; Fig. 3 is a side elevation with the blades in the same position as in Figs. 1 and 2, the leg of the tool being partially broken away, to show the relation of the operative parts; Fig. 4 is a detail on a somewhat enlarged scale taken on the line 4, 4 as of Fig. 2; Fig. 5 is a detail in plan taken on the line 5, 5 of Fig. 4 looking down; and Fig. 6 is a detail taken as looking to the right on Fig. 1 on the line 6, 6.

A blade supporting frame 1, of any convenient form, is provided for supporting blades 2, 3 as on pivots 4, 5, so that they may swing freely on the pivots, but their pivotal points will remain fixed, this being insured by the use of a transverse bar 6 between the pivots, which will effectually prevent any giving of the pivot points by springing outward or inward of the frame 1. This bar also serves as a shoe on the heel of the tool, to protect the heels of the blades from injury as by contacts with rocks or other obstructions in the use of the shears, and to serve as a convenient support for the blades if it is desired to rest the heel on the ground without using the tool.

The centrally depressed portion of the bar 6 and its backwardly extension in an arcuate form facilitate its use as a support, elevating the rear ends of the blades slightly above the ground but allowing the points to be rocked upward, or the tool to be rocked from side to side readily, as desired, in use, with a minimum of friction, and without danger of impairing the efficiency of operation of moveable parts by direct contact with the ground.

The blades are arranged so that their heel portions lap one over the other, as will the edge portions of the blades as the blades are closed one toward the other.

The blades are slightly sprung one toward the other, so that their edges lie in close contact at the cutting point, as the blades are closed, thus insuring a positive, shear cut.

In the lower blade is rigidly fixed a pivot pin 7, preferably made with an enlarged portion 8, so that when the end of the pin 7 is riveted below the blade 3 the blade will be grasped below the rivet-head and the shoulder of the large portion 8, so that the pin will be rigidly held in the blade 3 and cannot wabble or play therein.

The blade 2 is provided with a slightly elongated opening 9, which accommodates the portion 8 of the pivot pin 7, with sufficient play to allow the sliding over of the pivot in the hole as the pin is drawn back into line with the pivots 4, 5. But in this movement, the pin cannot rock or wabble in the hole 9, because of the fixed plane in which the blades are mounted in the frame and the fact that the pin is rigidly connected with the blade 3. This insures true and smooth bearing between the blade 2 and the pivot pin, and avoids the unequal wearing of the pin, which would take place if it could bend or rock from one side to the other in its contacts with the blades.

The pin 7 is preferably provided with a flange or similar element 10 adapted to lie above the blade 2 and assists in keeping it to duty. If desired, the space between the flange and the blade 3 may be slightly wider than the thickness of the blade 2, so that the blade may slide up on the pin a trifle to relieve the spring pressure as the blades are closed, if that is found desirable in practice.

A spring 11 is preferably interposed between the blades to assist in opening them at the end of a cutting movement.

The pin 7 may be reciprocated by suitable means such as pivoted lever 12 operatively engaging the pin with its end 13.

By means of my improvements I secure a positive, true, shear movement of the blades, avoid the back-lash and uneven wear and tear inseparable from the use of a pivot, which is not definitely or positively fixed in one of the blades; and I get rid of the inequalities of the cutting operation which develop in such a tool through wear due to the use of a loose pivot pin, which will both be worn itself and will wear the blades away unequally, so as to make the operation of the tool uncertain and unsatisfactory.

The use of the stiffening bar 6 also gives rigidity to the supporting elements of the shears, preventing their pivot points from springing out of place; allowing the use of lighter material for the frame of the shears, and introducing into shears a protective heel shoe, improving the efficiency of the tools in actual use.

I wish it to be understood that the particular embodiment of my improvements which I have shown, is to be considered as a typical and not as an exclusive form. For details of construction might be changed as by the use of mechanical equivalents without departing from the spirit of my invention as claimed.

Having thus described my invention what I claim and desire to secure by Letters Patent of the United States is:—

1. In grass shears embodying a handle-frame provided with a pair of downwardly extended legs, a blade pivoted to and below each leg, the blades being provided with relatively overlapping heel portions movable in parallel planes, a pin rigidly fixed in the lower heel and passing freely through the upper heel and terminating in a free end, the clearance of the pin in the upper heel being sufficient to allow the blades to open and to close upon each other through the length of their cutting edges, means for reciprocating the pin to actuate the blades toward and away from each other and a heel shield embodying a rigid plate having a depressed, central portion extending between the legs below the blades and their heels and secured to the legs by the blade pivots and constituting means for supporting the shears slidably upon the ground in operative position.

2. In grass shears embodying a handle-frame provided with a pair of downwardly extended legs, a blade pivoted to and below each leg, the blades being provided with relatively overlapping heel portions movable in parallel planes, a pin rigidly fixed in the lower heel and passing freely through the upper heel and terminating in a free end, the clearance of the pin in the upper heel being sufficient to allow the blades to open and to close upon each other through the length of their cutting edges, means for reciprocating the pin to actuate the blades toward and away from each other, and a heel shield embodying a rigid plate having a depressed, central, backwardly extended portion extending between the legs below the blades and their heels and secured to the legs by the blade pivots and constituting means for supporting the shears slidably upon the ground in operative position.

FREDERIC H. RAUH.